United States Patent
Salas et al.

(10) Patent No.: US 10,288,121 B2
(45) Date of Patent: May 14, 2019

(54) ROTATION FLEXURE WITH TEMPERATURE CONTROLLED MODAL FREQUENCY

(71) Applicant: National Technology & Engineering Solutions of Sandia, LLC, Albuquerque, NM (US)

(72) Inventors: Theodore E. Salas, Los Lunas, NM (US); Patrick S. Barney, Albuquerque, NM (US); Aaron M. Ison, Albuquerque, NM (US); Ronald L. Akau, Albuquerque, NM (US); Nathan Weir, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/667,524

(22) Filed: Aug. 2, 2017

(65) Prior Publication Data

US 2017/0356501 A1  Dec. 14, 2017

Related U.S. Application Data

(62) Division of application No. 14/540,364, filed on Nov. 13, 2014, now Pat. No. 9,759,263.

(51) Int. Cl.
| | |
|---|---|
| F16C 41/00 | (2006.01) |
| F16C 17/22 | (2006.01) |
| F16C 27/04 | (2006.01) |
| F16C 11/12 | (2006.01) |
| F16C 37/00 | (2006.01) |

(Continued)

(52) U.S. Cl.
CPC ............ *F16C 41/00* (2013.01); *F16C 11/12* (2013.01); *F16C 17/22* (2013.01); *F16C 17/243* (2013.01); *F16C 19/522* (2013.01); *F16C 19/527* (2013.01); *F16C 27/04* (2013.01); *F16C 19/525* (2013.01); *F16C 37/007* (2013.01); *F16C 2202/20* (2013.01); *F16C 2370/20* (2013.01);
(Continued)

(58) Field of Classification Search
CPC ........ F16C 11/12; F16C 17/22; F16C 17/243; F16C 19/525; F16C 19/527; F16C 25/08; F16C 33/586; F16C 37/00; F16C 2202/20; F16F 1/185; F16F 1/027; F16F 2238/022
USPC ............... 384/447, 476, 535, 537, 558, 605; 360/245.3; 403/220, 291; 464/81, 83, 464/100; 267/158, 161–163, 160; 188/378–390
See application file for complete search history.

(56) References Cited

U.S. PATENT DOCUMENTS 2,735,731 A * 2/1956 Freebairn, Jr. et al. ..................... G01C 19/22
267/160
2,767,973 A * 10/1956 Ter Veen ................ G01P 15/11
267/161

(Continued)

*Primary Examiner* — Marcus Charles
(74) *Attorney, Agent, or Firm* — Madelynne J. Farber

(57) ABSTRACT

A flexure bearing includes an inner race, an outer race, and a plurality of substantially planar radially extending blades coupled between the inner and outer race. The blades have a thickness that is thinner than a thickness of the inner and outer races. The inner race, outer race, and blades have substantially the same height. At least one heating element is coupled to the inner race and/or the outer race. The heating element is configured to apply heat to the race that it is coupled to in order to tune the flexure bearing.

7 Claims, 6 Drawing Sheets

(51) Int. Cl.
*F16F 1/02* (2006.01)
*F16C 17/24* (2006.01)
*F16C 19/52* (2006.01)
*F16F 1/18* (2006.01)

(52) U.S. Cl.
CPC ......... *F16F 1/185* (2013.01); *F16F 2238/022* (2013.01)

(56) References Cited

U.S. PATENT DOCUMENTS

| | | | | |
|---|---|---|---|---|
| 4,349,183 | A * | 9/1982 | Wirt | G01C 19/70 267/160 |
| 4,802,784 | A * | 2/1989 | Brooks | F16C 11/12 267/160 |
| 5,209,461 | A * | 5/1993 | Whightsil, Sr. | A63B 21/0455 267/154 |
| 5,492,313 | A * | 2/1996 | Pan | F16F 1/025 267/161 |
| 5,529,277 | A * | 6/1996 | Ostaszewski | F16C 11/12 248/398 |
| 6,146,044 | A * | 11/2000 | Calvet | F16C 11/12 267/154 |
| 6,440,044 | B1 * | 8/2002 | Francis | A63B 21/0455 482/114 |
| 2003/0030348 | A1 * | 2/2003 | Lopatinsky | H02K 1/12 310/164 |
| 2008/0193275 | A1 * | 8/2008 | De Filippis | H02K 1/276 415/10 |
| 2010/0145510 | A1 * | 6/2010 | Ihrke | B25J 17/0241 700/245 |

\* cited by examiner

ROTATION FLEXURE WITH TEMPERATURE CONTROLLED MODAL FREQUENCY

CROSS-REFERENCE TO RELATED APPLICATIONS

This application is a divisional application of, and discloses subject matter that is related to subject matters disclosed in, parent application U.S. Ser. No. 14/540,364 filed Nov. 13, 2014, issued as U.S. Pat. No. 9,759,263 and entitled "ROTATION FLEXURE TEMPERATURE CONTROLLED MODAL FREQUENCY". The present application claims the priority of its parent application, which is incorporated herein by reference in its entirety for any purpose.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Flexural bearings are used to provide a linear range of rotation versus torque to enable precision engineering, pointing, and control. Many applications involve a primary modal frequency. If multiple parts are vibrating at the primary modal frequency, damage can occur to the parts. Existing flexure bearings provide a constant rotational stiffness, which requires high fidelity design in order to meet specific modal frequency requirements.

A flexure bearing is typically made of metal and has a geometry that permits a low stiffness in one degree of freedom and high stiffness in all others. Flexure bearings can be made of a solid piece of metal that has been cut into the flexure bearing shape. There are a number of companies that sell flexure bearing products, such as C-Flex, of Frankfort, N.Y. Tunable modal frequency devices, such as those sold by Minusk K Technology, of Inglewood, Calif., currently employ mechanisms to change the frequency of the bearing. These devices require manual or motor driven methods. In operation, flexure blades may be used to reduce the line-of-sight jitter (or pointing error) of a telescope that is associated with rotational positioning of a telescope.

SUMMARY

The following is a brief summary of subject matter that is described in greater detail herein. This summary is not intended to be limiting as to the scope of the claims.

Described herein are various technologies pertaining to controlling the frequency and stiffness of a flexure bearing. The flexure bearing includes an inner race, an outer race, and a plurality of substantially planar radially extending blades coupled between the inner and outer races. The blades have a thickness that is thinner than a thickness of the inner and outer races and the inner race, outer race and blades have substantially the same height. The flexure bearing includes at least one heating element coupled to the inner and/or outer races. The heating element is configured to apply heat to the associated race in order to tune the flexure bearing.

In another embodiment, a flexure bearing includes a flexure bearing body and a heating or cooling mechanism. The heating or cooling mechanism is coupled to at least part of the flexure bearing body for tuning the frequency of the flexure bearing body.

In another embodiment, a method for modally tuning a flexure bearing includes providing a flexure bearing having at least one of an inner surface or an outer surface, coupling a heater or a cooler to at least one of the inner surface or the outer surface of the flexure bearing, and tuning the flexure bearing by applying heating or cooling to the flexure bearing.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
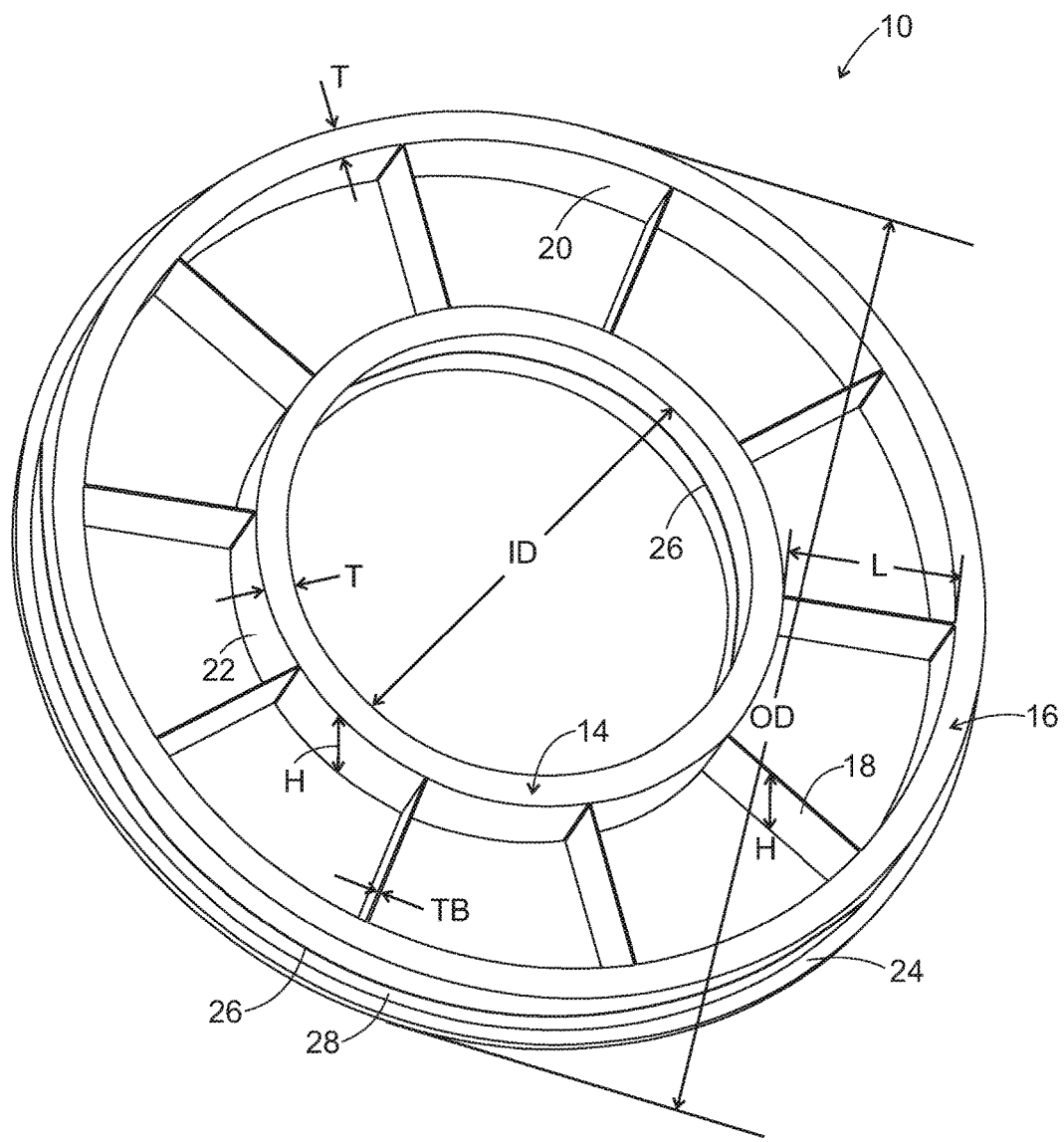
FIG. 1 is a perspective top view of an exemplary flexure bearing and associated heater elements.
Figure 2:
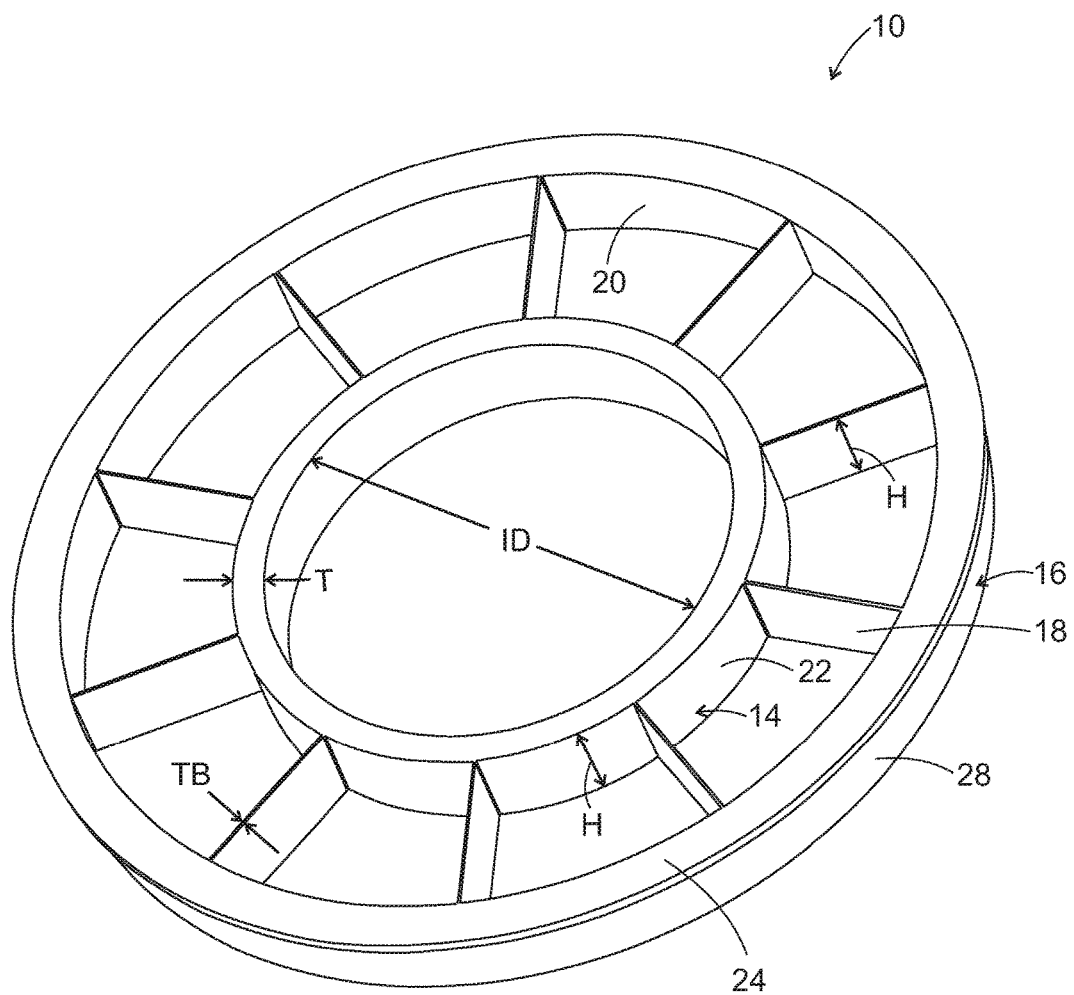
FIG. 2 is a perspective bottom view of the flexure bearing of FIG. 1, without a heater element.

Various technologies pertaining to a mounting apparatus are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Flexure bearings 10 can be utilized in a wide variety of applications in order to stabilize parts and systems. One such application is in the pointing or repointing of telescopes. In this environment, flexure bearings 10 are used to reduce the jitter associated with stiction (or static friction) that occurs during movement or pointing of the telescope. While cameras will often have anti-vibration methods associated with them, large scale telescope systems do not typically have anti-vibration devices built in. Telescopes often utilize roller element bearings (not shown) that are prone to stiction. As the telescope is moved from one direction to the other direction, there is a catch that occurs so that the bearing stops for a minute and a large force is needed in order to navigate over the "hump." This is a non-linearity that is undesirable because it causes jitter or vibration of the telescope system. Since flexure bearings 10 have a very linear characteristic, they are useful in the context of changing rotational direction in order to avoid or minimize the effects of stiction in telescope movement. The exemplary embodiments discussed herein may also be applicable to other devices where vibration is desired to be avoided.

Exemplary flexure bearings 10 may be used, for example, in precision pointing systems that are mounted to moving platforms, in synthetic aperture radar systems, or in isolation tables that are used in optical systems to decrease the amount of vibration. Flexure bearings 10 rotate with the device in order to reduce the vibration associated with the movement of the device. Flexure bearings 10 may also be used in tuned vibration absorbers of structural systems, such as automobiles or aircraft. By adding a flexure bearing 10 to current telescope systems, the jitter associated with stiction can be reduced.

Flexure bearings 10 are used to linearize tools—providing a linear range of rotation versus torque. As mentioned above, jitter or vibration can be an issue with the movement of telescoping systems. The examples provided herein assist in limiting the amount of jitter that is experienced by telescopes during repositioning.

The flexure bearing 10 described herein has a limited range of motion where the stiffness is very soft, creating a very low frequency mode. The low frequency of the system results in an isolation of base disturbances and an easily controllable structure. The natural frequency (or internal stiffness) can be affected and controlled by utilizing temperature differentials within the flexure bearing 10, which are created by the use of a heating element or cooling element 26. The example flexure bearing 10 allows the natural frequency of the device to be significantly changed using minimal energy. Flexure bearings 10 have been found to have a sensitivity to temperature differences across the bearing. Stiffness (and therefore performance) of the bearing 10 can change as a function of temperature.

Stiffness is the rigidity of an object, or the extent to which it resists deformation in response to an applied force. Stiffness (K) is determined by dividing the applied force by distance of deflection, or $k=P/\delta$, where P is applied force and $\delta$ is distance of deflection. Rotational stiffness is defined by the formula $k=M/\Theta$, wherein k is the rotational stiffness, M is the applied moment, and $\Theta$ is the rotation. The rotational stiffness is the change in torque required to achieve a change in angle. The effect of changing angle on torque for a given distance is approximately linear.

A primary modal frequency (or stiffness) is a characteristic or quality that is naturally associated with each application. When a flexure bearing 10 vibrates at the primary modal frequency of the associated device, damage or unwanted consequences may occur. The exemplary bearing 10 described herein permits modification of the primary modal frequency of the bearing 10 by varying the temperature across the bearing 10, resulting in frequency changes. This advantageously can occur without requiring a user to push a button or turn a knob. Heating (or cooling) can occur continuously once the part has been tuned. Frequency changes up to a factor of four may be possible. The ability to modify modal frequency using simple low power heating or cooling is beneficial to a system designed of tunable isolated systems.

While either heating or cooling can be used to vary the temperature across the bearing 10, heating is often easier to apply. Cooling may be desirable in certain situations. The following disclosure discusses the heating of the bearing 10. It should be recognized that cooling may be substituted for heating when desired. Stiffness and natural frequency are used herein interchangeably since they are proportional to one another.

An exemplary flexure bearing 10 is shown in FIGS. 1-4 and includes an outer race 14, an inner race 16, and flexures or blades 18 that couple the inner race 14 to the outer race 16. The flexures 18 are generally radially disposed between the inner and outer races 14, 16. The flexures 18 radiate outwardly from the inner race 14 to the outer race 16. The bearing 10 may have a consistent height H, such that the races 14, 16 and blades 18 all have substantially the same height. The blades 18 and races 14, 16 may have the same thickness, although typically the races 14, 16 will have a thickness T that is greater than the thickness TB of the blades 18. The races 14, 16 may have a height H that is different from that of the blades 18, if desired (not shown), in some embodiments.

Figure 3:
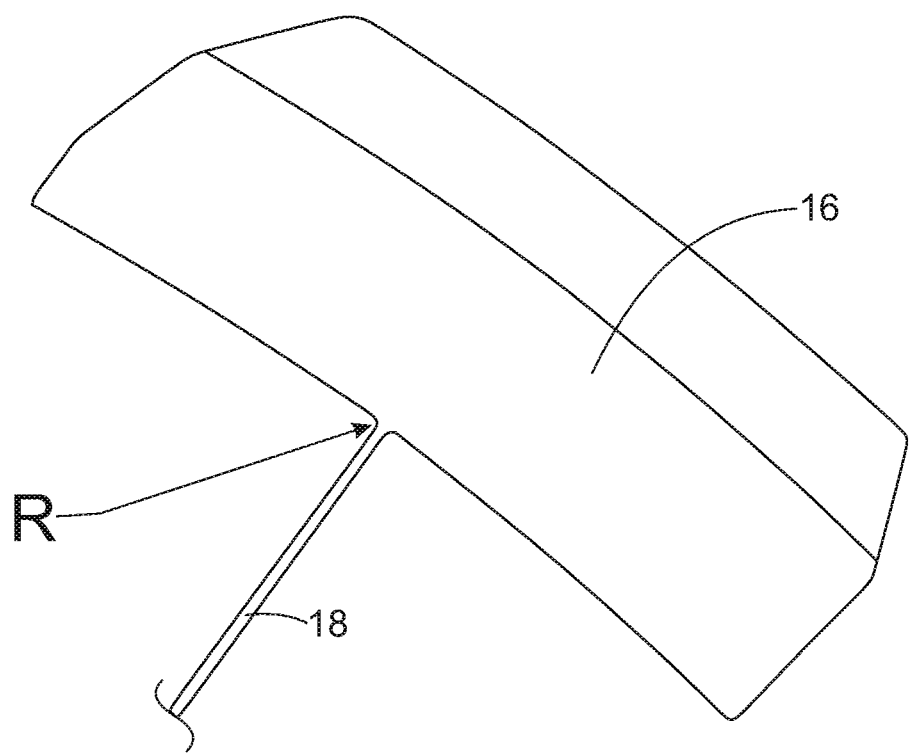
FIG. 3 is an exploded view of a portion of the flexure bearing of FIG. 1, showing the connection between a flexure blade and an outer race of the bearing.

The inner race 14 has an inner diameter ID and an outer diameter. The outer race 16 has an inner diameter and an outer diameter OD. The flexure blades 18 have a length L equal to the difference between the outer diameter of the inner race 14 and the inner diameter of the outer race 16. As shown in FIG. 3, a radius R may be provided on either side of the flexure blades 18 where the blades 18 mate with the inner surface 20 of the outer race 16 and the outer surface 22 of the inner race 14. The flexure blades 18 are generally thin and planar. The flexure blades 18 are typically thinner than a thickness T of the races 14, 16.

The outer race 16 of the bearing 10 depicted in the figures includes an enlarged ledge 24 that is coupled to one side of the outer race 16. In the example shown, the ledge 24 is coupled to the back side of the bearing 10 and provides an increased width ledge that can be used for assisting in retaining a heating element or heater 26, for assisting in retaining a roller bearing 30, or a combination of both. Alternatively, the ledge may be optional.

Figure 4:
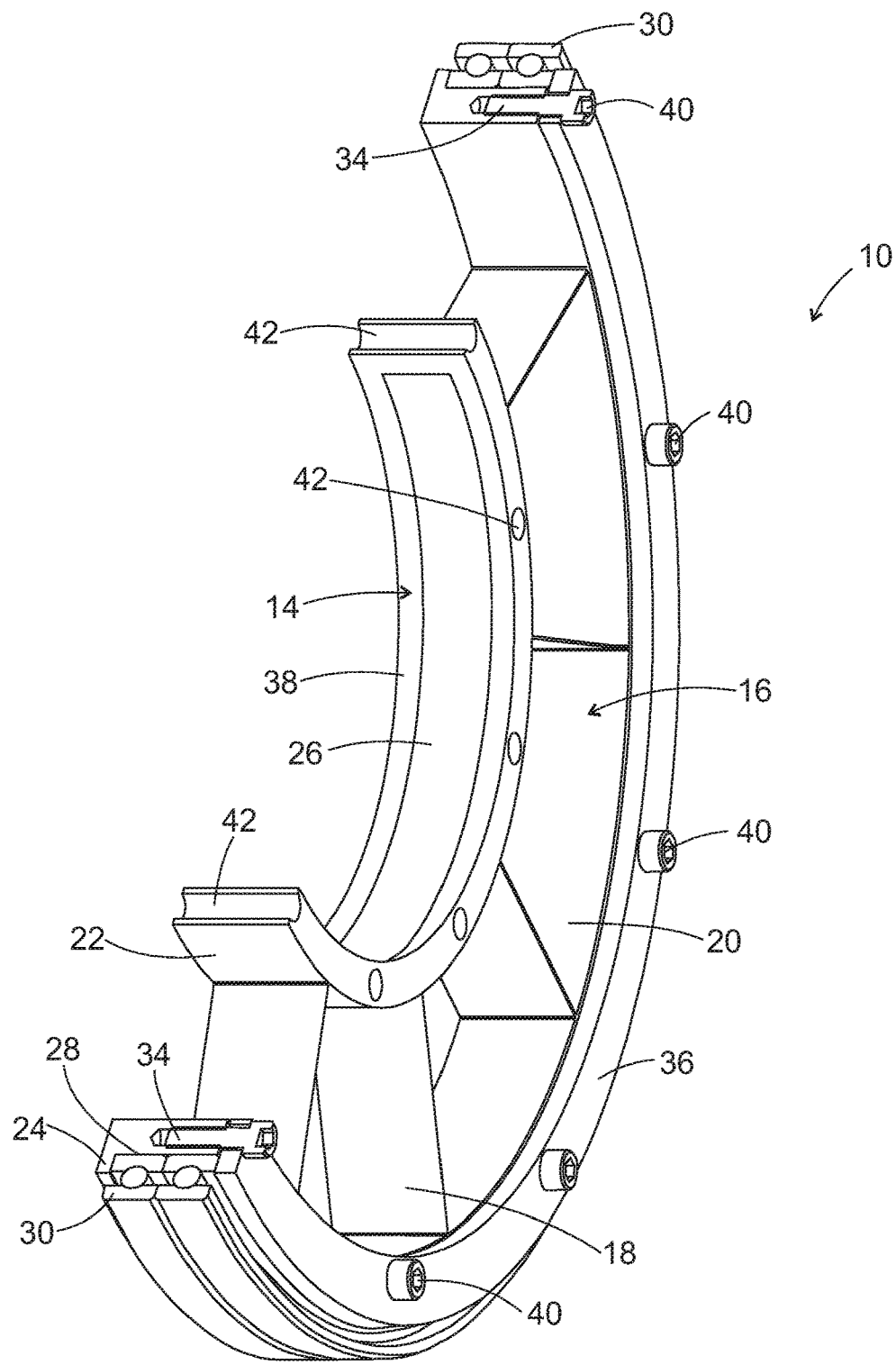
FIG. 4 is perspective cross-sectional view of a flexure bearing installed in a roller bearing element for large motions of telescopes, with a strip heater installed on a surface of the inner race of the flexure bearing.

FIG. 4 shows an application of the flexure bearing installed with a roller bearing element 30 positioned around the outer periphery of the outer race 16. As shown in FIG. 4, the bearing element 30, is positioned around the outer surface 28 of the bearing 10, directly adjacent the outer surface 28 and ledge 24. In this example, the heating element 26 is shown positioned on the inner surface 38 of the inner race. The heating element partially covers the inner surface 38, but may entirely cover the inner surface 38, if desired. The heating element 26 may be any type of heating element and may be retained on the inner surface 38 by any known means for attaching the heating element to the inner race 14. The outer race 16 includes a plurality of screw holes 34 that extend laterally into the race 16 (in a perpendicular manner relative to the radius of the bearing 10). The screw holes 34 that are shown are provided in order to couple a circular retaining plate 36 to the front side of the flexure bearing 10 in order to hold the roller bearing element 30 in position between the ledge 24 and the plate 36.

A resistive heater 26, such as a flexible strip heating element 26, or a specially designed and shaped heating element, may be applied to the outer surface 28 of the outer race 16, or on the inner surface 38 of the inner race 14. For example, in FIG. 4, the heating element 26 is shown applied against the inner surface 38 of the inner race 16. Alternatively, the heating element 26 could be applied to the outer surface of the roller bearing 30. The heating element 26 could be applied to the flexure bearing 10 in any known manner, including via an adhesive, such as a pressure sensitive adhesive, or the like. When a heating element 26 is applied to the inner surface 38 of the inner race 14, the ledge 24 may be positioned to extend inwardly to assist in positioning the heating element 26 (not shown). Alternatively, the ledge 24 may be optional.

Any number of different types of heaters may be used. For example, silicone rubber heaters, polyimide film insulated heaters, heating tapes, rope heaters, heating cords, or other known heaters may be used. The heaters 26 are shown in the figures as extending around the entire perimeter of the flexure bearing 10. In some instances, a partial heater may be used, such as one that only covers a portion of the perimeter of the flexure bearing 10, or one that only covers a portion of the height of the bearing 10, as shown in FIG. 4.

As previously discussed, FIG. 4 depicts a roller bearing 30 installed around the inner surface 38 of the inner race 14. The roller bearing 30 is secured by screws 40 and a plate member 36. The device 10 in FIG. 4 also depicts holes 42 that extend perpendicularly into the inner race 14. The holes in the inner race 14 are depicted as extending through the height H of the inner race 14 and may be used for coupling the bearing 10 to another part, such as a telescope system (not shown).

The flexure bearing 10 may be formed from a monolithic structure using known manufacturing techniques. For example, the flexure bearing 10 may be cut from a piece of titanium. Since the bearing 10 may be cut from a monolithic structure, the inner and outer races 14, 16 and flexure blades 18 will have the same height, unless further processing changes the heights of the various parts. The inner and outer races 14, 16 may have the same thickness T or may have different thicknesses from one another.

The flexure bearing 10 is thermally tunable and has the ability to change the natural frequency of the bearing 10 by simply varying the temperature difference between the inner and outer races 14, 16 of the bearing 10. Resistive heaters 26 are attached to one or both of the inner and outer races 14, 16 in order to modify the temperature differential between the inner and outer races 14, 16. This results in a change in the natural frequency of the bearing 10. The size, number, and relative thickness of the flexure blades 18 are not significantly important for the thermal dependency feature of the device. Under laboratory testing, with a given inertia, the first mode torsional frequency was variable by more than a factor of three. The ability to change frequencies allows isolation systems to be easily tuned for particular base disturbances.

The flexure blades 18 flex or bend during relative displacement of the inner and outer races 14, 16. With small displacements, the stiffness is linear giving the desired response for precision pointing. With larger deflections, the stiffness increases non-linearly, engaging the standard course bearing set. As the inner or outer races 14, 16 thermally expand, the blades 18 are either more aligned (stretched) or less aligned (compressed). This significantly changes the preload and, therefore, the stiffness of the bearing 10. In order to change the diameter of the inner or outer races 14, 16, a heater 26 is applied to the inner race 14, outer race 16, or to both the inner race 14 and the outer race 16. The coefficient of thermal expansion (CET) is used as a mechanism to change the dimensions of the races 14, 16, including the race diameters. This phenomenon is depicted in FIGS. 5-7.

Figure 5:
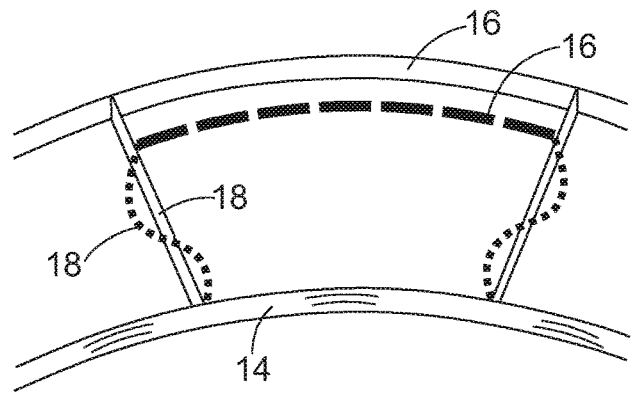
FIG. 5 is a schematic diagram illustrating microbuckling of flexure blades when an outer race of the flexure bearing is cooled.

In particular, in FIG. 5, the outer race 16 is shown contracting. This may occur, for example, by cooling the outer race 16. While the outer race 16 decreases in size, the inner race 14 remains at ambient and is substantially unchanged in diameter. As the diameter of the outer race 16 decreases such that the difference between the diameter of the inner and outer races 14, 16 is made smaller, a micro-buckling of the flexure blades 18 occurs, which results in a reduction in rotational stiffness (k). The same effect may occur by heating the inner race 14 (see description below in connection with FIG. 7.

Figure 6:
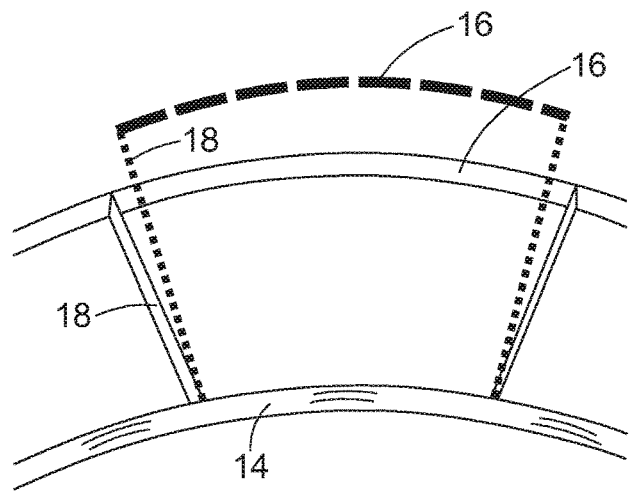
FIG. 6 is a schematic diagram illustrating pretensioning of the flexure blades when an outer race of the flexure bearing is heated.

In FIG. 6, the outer race 16 is shown expanding. This may occur by heating the outer race 16. Heating of the outer race 16 causes the diameter of the outer race 16 to expand, which causes the diameter different between the inner and outer races 14, 16 to increase. As the diameter difference between the inner and outer races 14, 16 increases, the flexure blades 18 pretension, which decreases stiffness and increases rotational stiffness. Thus, heating of the outer race 16 can cause increased rotational stiffness.

Figure 7:
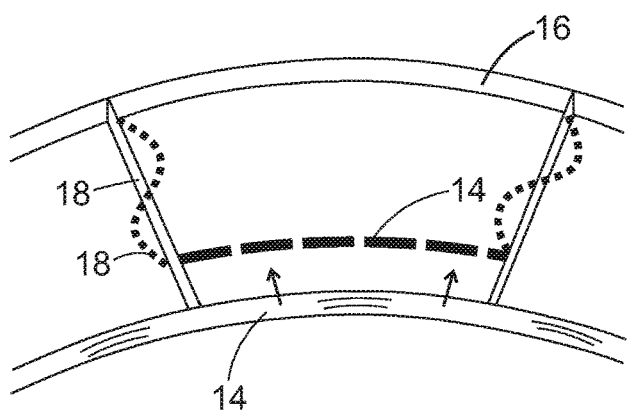
FIG. 7 is a schematic diagram illustrating microbuckling of flexure blades when an inner race of the flexure bearing is heated.

FIG. 7 shows the inner race 14 expanding. This occurs when the inner race 14 is heated. As the inner race 14 expands in size, the diameter difference between the inner and outer races 14, 16 to decreases, causing a micro-buckling of the flexure blades 18 that is similar to what occurred in connection with FIG. 5. Micro-buckling of the flexure blades 18 results in a reduction in rotational stiffness (k).

One type of material that may be utilized in the flexure bearing 10 is Titanium. Other types of materials may also be used in certain situations, like stainless steel. In the case of titanium, in one exemplary embodiment, the inner ring may be heated and the outer ring may remain at ambient. Because Titanium has such low thermal conductivity, once the inner ring is heated to be 5 degrees higher than the outer ring, the inner ring will stay at that temperature with very little power requirements.

In operation, when the inner race 14 expands, as discussed above, the flexure blades 18 tend to micro-buckle or bend. As the flexure bearing 10 encounters vibration to the inner race 14 relative to the outer race 16, one or more of the blades 18 will straighten out while other blades 18 buckle. This makes some of the blades 18 ineffective in their stiffness, so the end result is a reduced rotational stiffness.

In an exemplary embodiment, the flexure bearing 10 has an outer diameter of 6 inches and an inner diameter of 3 inches. The height H of the inner and outer races 14, 16 is about 1 inch and the thickness T of the inner and outer races 14, 16 is about ¼ inch. The thickness TB of the flexure blades 18 may be about 10 mil. The bearing 10 may be manufactured using Wire EDM machining by a machine shop. The design is completely scalable in size upwardly or downwardly. The size of the bearing 10 is a function of the size of the device that the bearing 10 is utilized with. The bearing 10 is designed to have the lowest frequency possible with the least stiffness. The bearing 10 size and shape is chosen as a function of the application.

Figure 8:
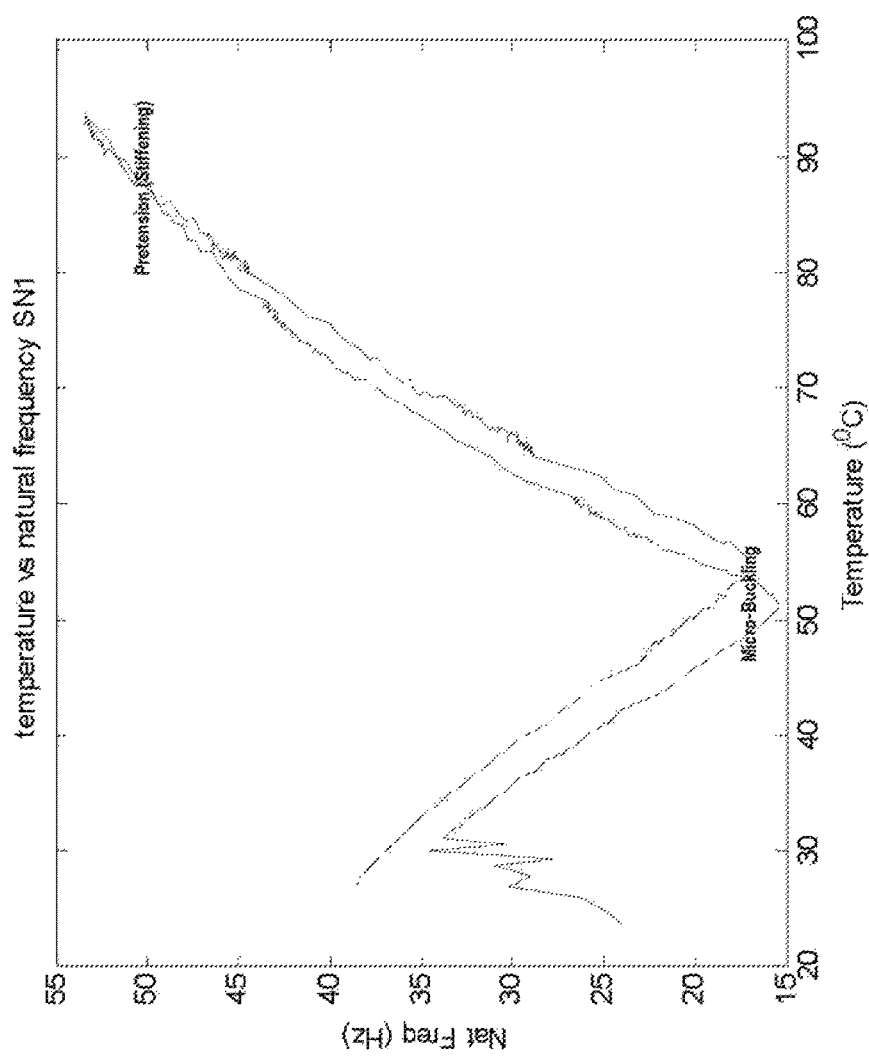
FIG. 8 is a plot showing a typical result of modal frequency versus outer race temperature when heat is applied to the outer race.

According to one example, a flexure bearing 10 having an inner and an outer race 14, 16, with flexure blades 18 positioned between the inner and outer races 14, 16 was used, with the inner race 14 grounded and the outer race 16 instrumented. Excitation for modal analysis was a broadband relative force from ground to the outer race 16. Frequency response functions were generated and fit to a single model to estimate the modal frequency as shown in FIG. 8. Modal frequency (natural frequency) was estimated as a function of outer race 16 temperature. The microbuckling point occurs at the bottom of the plot while the pretension-stiffening point occurs at the upper part of the plot at higher temperatures. Natural Frequency is related to the square root of stiffness.

The exemplary flexure bearing 10 allows for changing the primary modal frequency of a part by varying the temperature across the flexure bearing 10. Frequency changes of many factors, such as a factor of four, have been shown utilizing the technology described herein. The ability to modify modal frequency using simple low power heating can be very beneficial in system design of tunable isolated systems.

The exemplary device is a flexure bearing 10 that has a rotational stiffness that is operational with only a small amount of heat. Modal frequency can be tuned in-situ by varying temperature. The ability to control modal frequency can be a significant advantage when used in high accuracy pointing systems, as well as isolation platforms and tuned vibration absorbers.

The heaters 26 described herein may be controlled by a controller and a computer that includes computer programming (not shown). Sensors (not shown) may be utilized to measure the temperature of the various parts of the design. Sensors may also be utilized to dynamically calculate the modal frequency or stiffness and then tune the bearing 10 based upon these readings.

In operation, heating of the inner and/or outer races 14, 16 will occur slowly, such as over tens of minutes at a time. Because this is a thermal system, it is necessary to wait until the metals react to the change in temperature. Once a desired frequency is obtained, the heating can remain constant in order to hold the frequency for months at a time. It is possible to make changes more frequently, if desired. However, modal frequencies often do not change over time, or change very little, so tuning can typically occur on a limited basis.

While the flexure bearing 10 is shown and described as being circular, it should be recognized that a large number of flexure bearings of different designs are known to those of skill in the art. The exemplary embodiments described herein are applicable to any type of flexure bearing 10.

In a first example, a flexure bearing 10 includes an inner race 14, an outer race 16, and a plurality of substantially planar radially extending blades 18 coupled between the inner and outer races 14, 16. The blades 18 have a thickness TB that is thinner than a thickness T of the inner and outer races 14, 16. The inner race 14, outer race 16, and blades 18 have substantially the same height H.

The flexure bearing 10 may also include at least one heating element 26 coupled to the inner race 14 and/or the outer race 16. The heating element 26 may be configured to apply heat to the race 14, 16 that it is coupled to in order to tune the flexure bearing 10. When heat is applied to one of the inner or outer races 14, 16, a temperature differential develops across the blades 18 in order to change the stiffness or frequency of the blades 18.

The inner race 14 may be round and the outer race 16 may be round. The flexure bearing 10 may be formed from a single piece of material and may be made of titanium. The inner race 14 may be circular and the outer race 16 may be circular. The blades 18 may be substantially planar. The heating element 26 may be a low power resistive heating element. The heating element 26 may be applied to an entire surface 28 of the outer race 16, to an entire inner surface 38 of the inner race 14, to part of the outer surface 28 of the outer race 16, or to part of the inner surface 38 of the inner race 14.

In another example, a flexure bearing 10 includes a flexure bearing body 14, 16, 18 and a heating or cooling mechanism 26 coupled to at least part of the flexure bearing body for tuning the frequency of the flexure bearing body.

The flexure bearing body may have an inner member 14 and an outer member 16. The heating or cooling mechanism 26 may be coupled to one or more of the inner member 14 or the outer member 16. The inner member 14 may be a circular race and the outer member 16 may be a circular race having a larger diameter than a diameter of the inner member 14. The flexure bearing body also includes flexure blades 18 coupled between the inner member 14 and the outer member 16. The flexure blades 18 extend radially outwardly between the inner and outer members 14, 16. The heating or cooling element 26 may be a flexible strip heater or a resistive heater.

The flexure blades 18 may change in shape or size due to the application of heating or cooling by the heating or cooling member 26. The flexure blades 18 may have a thickness TB that is less than a thickness T of the inner race 14 and the outer race 16. The flexure bearing body may be a monolithic structure. The flexure bearing body may be tuned to a low frequency.

In another example, a method for modally tuning a flexure bearing 10 includes providing a flexure bearing 10 having at least one of an inner surface 38 or an outer surface 28, coupling a heater or a cooler 26 to at least one of the inner surface 38 or the outer surface 28 of the flexure bearing 10, and tuning the flexure bearing 10 by applying heating or cooling to the flexure bearing 10. The method may also include coupling the flexure bearing 10 to another device that has a natural modal frequency, with the tuning of the flexure bearing 10 step tuning the flexure bearing 10 to a frequency that is different from the natural modal frequency of the other device.

The term "substantially," as used herein, is a term of estimation.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A flexure bearing comprising:
a ring-shaped inner race;
a ring-shaped outer race;
a plurality of substantially planar radially extending blades coupled between the inner and outer race, with the blades having a thickness that is thinner than a thickness of the inner and outer races, wherein each blade has a proximal end attached to the inner race and a distal end attached to the outer race; and
a heating or cooling mechanism coupled to at least one of the inner race or the outer race,
wherein the inner race, the outer race, and the blades have substantially the same height.

2. The flexure bearing of claim 1, wherein the heating or cooling mechanism is configured to apply heat to the race that it is associated with in order to tune the flexure bearing.

3. The flexure bearing of claim 1, wherein when heat is applied to one of the inner or outer races, a temperature differential develops across the blades in order to change the stiffness or frequency of the blades.

4. The flexure bearing of claim 1, wherein the heating element is applied to at least part of the inner or outer race via an adhesive.

5. The flexure bearing of claim 1, wherein the flexure bearing is formed from a single piece of material and is made of titanium or stainless steel.

6. The flexure bearing of claim 1, wherein the heating or cooling mechanism is a low power resistive heating element.

7. The flexure bearing of claim 1, wherein the heating or cooling mechanism is applied to an entire outer peripheral surface of the outer race, or to an entire inner peripheral surface of the inner race, or to part of the outer peripheral surface of the outer race, or to part of the inner peripheral surface of the inner race.

* * * * *